United States Patent [19]

Fromson

[11] Patent Number: 5,069,948
[45] Date of Patent: Dec. 3, 1991

[54] STRUCTURAL UNIT HAVING HINGEDLY CONNECTED TETRAHEDRONS

[76] Inventor: Howard A. Fromson, P.O. Box 1318, Rockville, Conn. 06066

[21] Appl. No.: 561,962

[22] Filed: Aug. 2, 1990

[51] Int. Cl.$^5$ ................................................ B32B 1/04
[52] U.S. Cl. ...................................... 428/54; 428/12; 428/33; 52/108; 52/227
[58] Field of Search ................ 428/12, 33, 54; 52/227, 52/108

[56] References Cited

U.S. PATENT DOCUMENTS 3,237,362 3/1966 Fromson .............................. 428/48

Primary Examiner—Alexander S. Thomas
Attorney, Agent, or Firm—Felfe & Lynch

[57] ABSTRACT

Tetrahedral elements are hingedly connected along opposed edges to form an elongate structure with a pair of cable guides at apices of each pair of connected edges. Cables fixed at or near the apices of the element at the free end of the structure and passing through the guides are used to control the shape of the structure by applying tension at the fixed end of the structure.

10 Claims, 2 Drawing Sheets

STRUCTURAL UNIT HAVING HINGEDLY CONNECTED TETRAHEDRONS

BACKGROUND OF THE INVENTION

The present invention relates to an elongate structure of tetrahedral elements linearly arranged between a fixed end and a free end. Each element has two pairs of triangular faces, each pair of faces meeting at an edge which is connected to an edge of an adjacent tetrahedral element.

U.S. Pat. No. 3,237,362, incorporated herein by reference, describes a structural unit of this general type, in which a tubular blank is collapsed at regular intervals from diametrically opposite sides to form crimped sections which separate the tetrahedral elements. While bending at the crimped sections may be undertaken during manufacture to obtain a desired final shape, flexibility in use is not suggested. On the contrary, the nodes at the ends of the crimped sections may be tied by welding chordal rods to assure that the structure remains rigid.

The prior art structural unit has the characteristics of a structural skin system and retains all the torsional resistance of a tube. Applied external loads are distributed in all directions, thus reducing the high stresses in the directly loaded parts.

It would be desirable to retain the advantages of the prior art structural unit in a structure in which the shape could be readily changed.

SUMMARY OF THE INVENTION

According to the invention, each tetrahedral element is hingedly connected to the adjacent tetrahedral elements to permit rotation therebetween. Cable guides are provided at opposed apices of one of the edges, the guides being shared by the connected edge of the adjacent tetrahedral element. Cables are fixed to guides at the free end of the structure and routed through the remaining guides, whereby maintaining tension on the cables at the fixed end of the structure will maintain the shape of the structure.

Where the edges of each tetrahedral element are offset by ninety degrees as seen along the length of the structure, four cables are necessary to control the shape of the structure. Where the edges are offset by sixty degrees between succeeding elements, six cables are necessary. As outlined in U.S. Pat. No. 3,237,362, other variations in the geometric arrangement of the elements are possible.

The elongate structure according to the invention permits arranging the hingedly connected elements in any desired shape and then applying tension to the cables uniformly until the structure becomes rigid. Since changing the shape would require decreasing the tension in at least one cable, fixing the tension in the cables at the fixed end of the structure will maintain the shape.

According to a further aspect of the invention, the shape of the elongate structure may be changed as desired by changing the tension in the cables in a regulated manner. Where the elongate structure is used as a light fixture, for example, this would permit locating a light on the free end at any point in a three dimensional space defined by the geometry of the structure.

In order to control the tension on the cables during use, separate control units such as motor driven capstans are provided on the free end of each cable, on a stanchion or the like at the fixed end of the structure. For precision movements, as in robotics applications, co-ordinated control of the control units by a computer or the like is possible.

DETAILED DESCRIPTION OF THE PREFERRED EMBODIMENT

Figure 1:
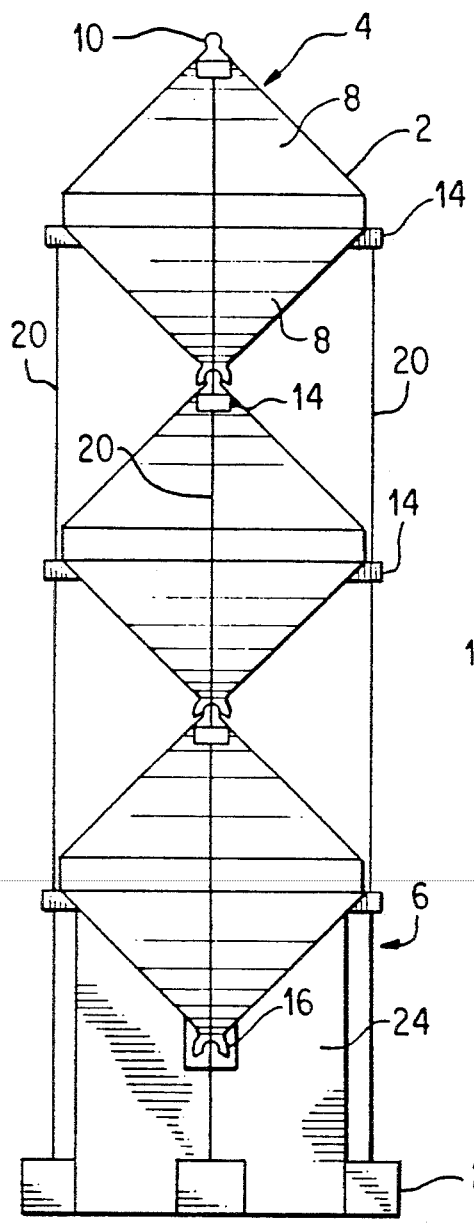
FIG. 1 is an elevation of the elongate structure according to the invention.
Figure 3:
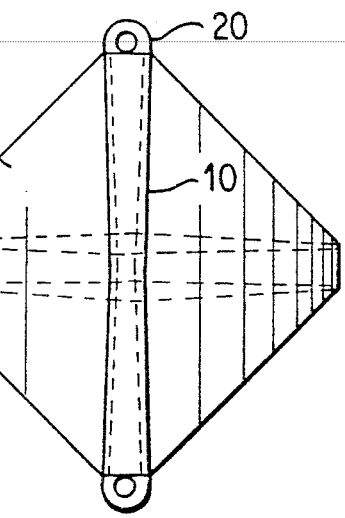
FIG. 3 is a side view of a tetrahedral element taken at a right angle to FIG. 2.
Figure 2:
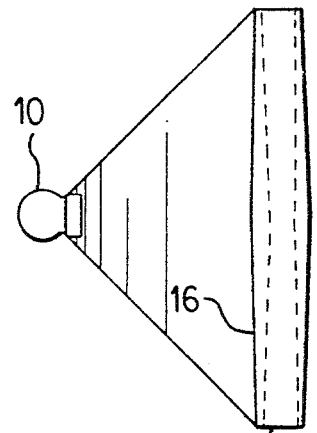
FIG. 2 is side view of a tetrahedral element.
Figure 4:
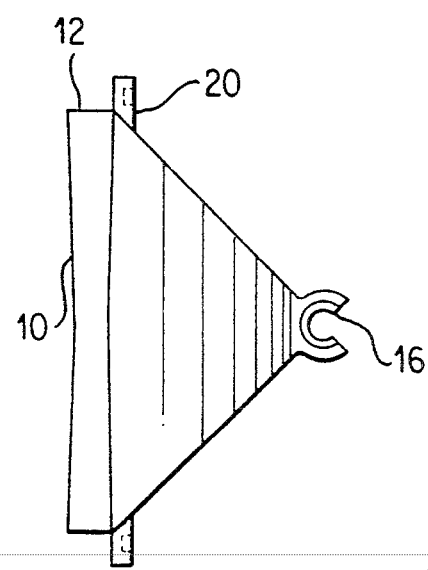
FIG. 4 is a plan view looking at the first edge.
Figure 5:
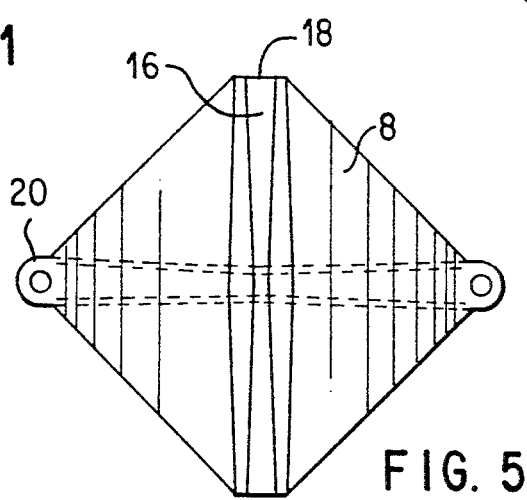
FIG. 5 is a plan view looking at the second edge.

Referring to FIG. 1, the elongate structure of the invention includes a plurality of tetrahedral elements 2 extending between a free end 4 and a fixed end 6 on a base 24. For simplicity, only six elements 2 are shown, though many more are possible.

Each element 2 has four triangular faces 8; two faces meet at a first rectilinear edge in the form of bead 10, while the other two faces meet at a second rectilinear edge in the form of channel 16. Each first edge 10 extends between a first pair of opposed apices 12, while each second edge 16 extends between second pair of opposed apices 18. A pair of cable guides 14 is fixed to each tetrahedral element 2 adjacent the respective first apices 12.

Each first edge is hingedly connected to a second edge of an adjacent connector, and vice versa, excepting of course the exposed edges of the elements at the extreme ends of the structure. In the preferred embodiment shown, this hinged connection is accomplished by fitting a bead 10 into the arcuate channel 16 o the second edge of an adjacent connector.

Referring to FIGS. 2-5, each bead 10 is substantially round over 270° of its cross section and diverges towards the ends which form the first apices 12. Each channel 16 is open over 180° to 270° of its cross section, which diverges toward the ends which form the second apices 18 in order to complement the shape of bead 10. The guides 14 adjacent first apices 12 are simply eyelets which extend beyond the profile of the structure in order to allow the cable to pass freely therethrough. For some applications it may be desirable to fit the eyelets with bushings to reduce friction and wear.

For light duty applications, such as a household light fixture, the tetrahedral elements are molded of a suitable plastic such as polypropylene. This permits a snap together assembly of beads and channels as shown. Where the channel is open over only 270° (FIG. 3) the 90° orientation of the faces 8 meeting along bead 10 (FIG. 1) would obviously limit the relative rotation between elements 2. When the channel is open over less than 180°, no snap action and self retention is possible. However, it should be borne in mind that ultimately the connecting force is provided by cables threaded through the guides.

Referring again to FIG. 1, two of the four cables 20 are fixed to the guides 14 of the tetrahedral element at the free end of the structure, while the other two cables 20 are fixed to the guides of the element 2 immediately therebelow. The cables extend through the guides as shown and end in control boxes 22 adjacent base 24.

Each control box 22 contains a capstan or the like which may be driven by an electric motor to control the tension of the respective cable. The control boxes may be controlled by a computer to coordinate the tension in the various cables to effect a desired change of shape in the structure.

The cables preferably have a low modulus of elasticity for more precise control of position. For light fixtures, monofilament nylon may be used, and it is possible to run insulated electrical wire from the power supply through the guides as well. For heavy structures steel cable is more desirable.

Other hinge arrangements are possible. For example, a conventional door-type hinge having interleaved cylindrical sections which receive a pin may be fixed across each pair of first and second edges to be connected.

Figure 6:
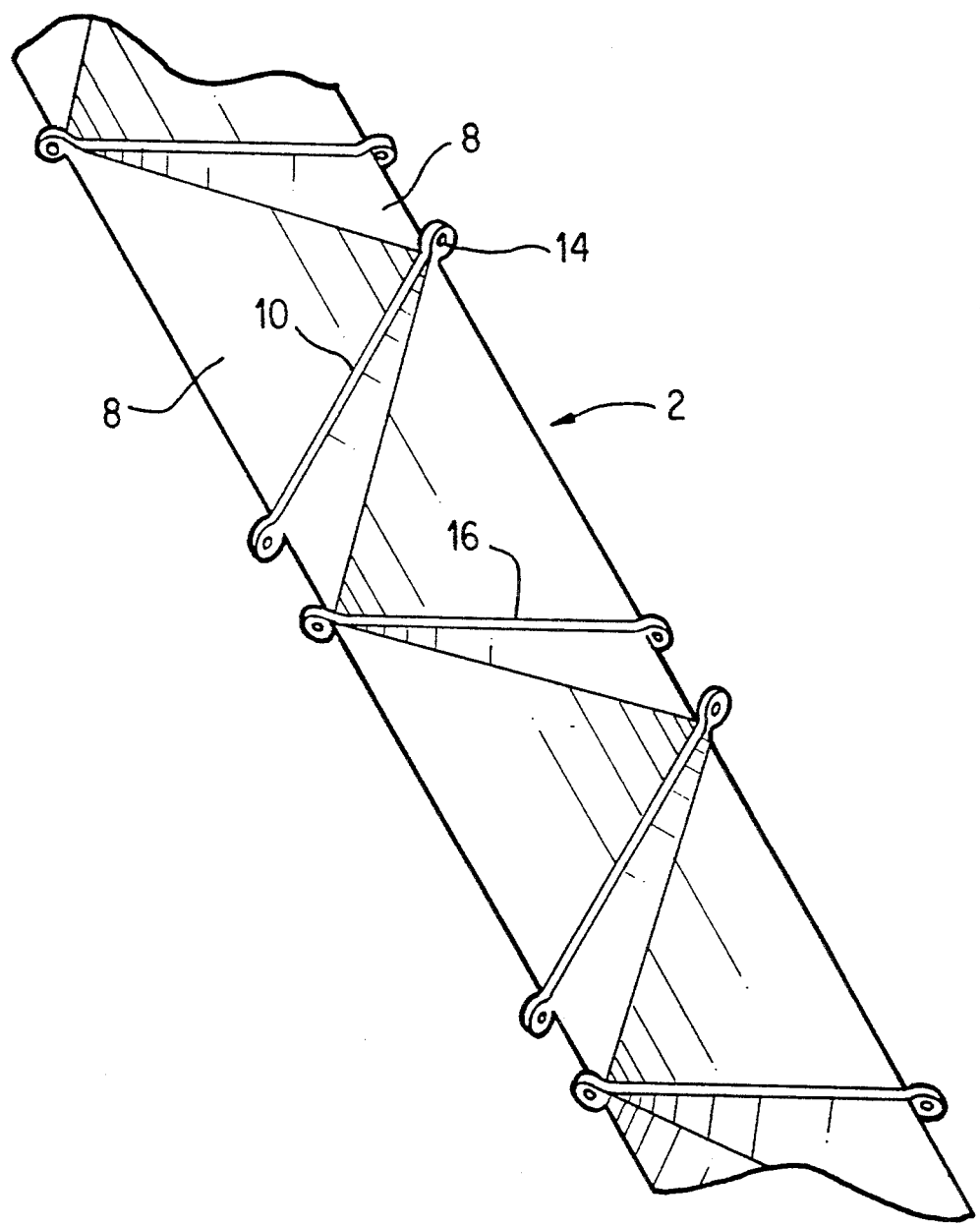
FIG. 6 is a perspective of the elongate structure manufactured by collapsing a tubular blank.

As shown in FIG. 6, manufacture of the structure by crimping a tubular blank as in U.S. Pat. No. 3,237,362 is also envisioned. Here it is necessary to choose a plastic which will provide sufficient flexibility at the crimped sections while maintaining sufficient load supporting strength across the faces. Once again polypropylene is a suitable choice, the tubular blank being heated sufficiently during crimping to extrude the guides and turn them 90° to obtain the orientation shown. For this embodiment it is possible to lay the electrical wire through the blank where a light fixture is contemplated.

The foregoing is exemplary and not intended to limit the scope of the claims which follow.

What is claimed is:

1. An elongate structure comprised of a plurality of tetrahedral elements linearly arranged, said structure having a fixed end and an opposed free end, each tetrahedral element comprising four triangular faces, two of said faces meeting at a first rectilinear edge extending between a first pair of opposed apices, the other two of said faces meeting at a second rectilinear edge extending between a second pair of opposed apices, the first rectilinear edge of at least one of said tetrahedral elements being hingedly connected to the second rectilinear edge of a further said tetrahedral element, the second edge of said at least one element being hingedly connected to the first edge of a still further said tetrahedral element, a pair of guides at respective opposed apices of one of said first and second rectilinear edges, said guides being shared by first and second edges which are hingedly connected, four cable elements fixed to respective apices at the free end of the structure, each cable element passing through guides which are linearly aligned as seen along the length of the structure, the shape of the elongate structure may be controlled by controlling the tension in the cable means at the fixed end of the elongate structure.

2. An elongate structure as in claim 1 wherein each second rectilinear edge is displaced ninety degrees from the first rectilinear edge of the same tetrahedral element, as seen along the length of the structure.

3. An elongate structure as in claim 1 wherein said structure comprises a tubular element which is plastically deformed by crimping to form rectilinear edges which are hingedly connected, which edges define said tetrahedral elements therebetween.

4. An elongate structure as in claim 1 wherein each tetrahedral element is formed discretely, said at least one tetrahedral element being connected to at least said further tetrahedral element by hinge means.

5. An elongate structure as in claim 4 wherein said hinge means comprises a bead along one of said edges of said at least one tetrahedral element and a complementary channel along the hingedly connected edge of at least said second tetrahedral element, said channel being profiled to retain said bead therein.

6. An elongate structure as in claim 5 wherein said tetrahedral element is constructed so that said channel receives said bead in a snap fit.

7. An elongate element as in claim 6 wherein each channel has a central portion with a cross section which diverges toward said ends, the complementary shape of the respective bead serving to center said bead in said channel.

8. An elongate structure as in claim 6 wherein each channel has a central portion with a cross section which converges toward said ends, the complementary shape of the respective bead serving to center said bead in said groove.

9. An elongate structure as in claim 1 wherein said tetrahedral elements are made of polypropylene.

10. An elongate structure as in claim 1 wherein at least one of said cable elements is an insulated electrical wire, whereby said structure may be used as a light fixture.

* * * * *